(12) United States Patent
Kazmi et al.

(10) Patent No.: US 8,755,471 B2
(45) Date of Patent: Jun. 17, 2014

(54) METHOD AND APPARATUS FOR REFERENCE SIGNAL MUTING DETECTION IN A WIRELESS COMMUNICATION NETWORK

(75) Inventors: Muhammad Kazmi, Bromma (SE); Iana Siomina, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/639,125

(22) PCT Filed: Oct. 11, 2010

(86) PCT No.: PCT/SE2010/051094
§ 371 (c)(1),
(2), (4) Date: Oct. 3, 2012

(87) PCT Pub. No.: WO2011/129734
PCT Pub. Date: Oct. 20, 2011

(65) Prior Publication Data
US 2013/0022096 A1 Jan. 24, 2013

Related U.S. Application Data (60) Provisional application No. 61/323,100, filed on Apr. 12, 2010.

(51) Int. Cl.
*H04L 27/06* (2006.01)
*H03D 1/00* (2006.01)

(52) U.S. Cl.
USPC .......... 375/343; 375/260; 375/316; 375/324; 375/340

(58) Field of Classification Search
USPC .......... 375/316, 324, 340, 343, 260
See application file for complete search history.

(56) References Cited

U.S. PATENT DOCUMENTS

2001/0024468 A1* 9/2001 Miyashita et al. ............ 375/228
2005/0276340 A1 12/2005 Chow
(Continued)

FOREIGN PATENT DOCUMENTS

| JP | 2007013627 A | 1/2007 |
| JP | 4685937 B2 | 5/2011 |
| WO | 2006130502 A1 | 12/2006 |

OTHER PUBLICATIONS

3RD Generation Partnership Project. "Link Results for RSTD Accuracy." 3GPP TSG-RAN WG4 Meeting #54, R4-100510, San Francisco, USA, Feb. 22-26, 2010.
(Continued)

*Primary Examiner* — Ted Wang
(74) *Attorney, Agent, or Firm* — Coats & Bennett, P.L.L.C.

(57) ABSTRACT

The present invention provides a method and apparatus for autonomously detecting whether a reference signal within an OFDM signal transmitted by a remote transmitter is or is not muted for a given transmission time. Muting or puncturing may be applied to all or only a portion of the reference signal. The method, which may be carried out in an appropriately configured radio apparatus, includes receiving the OFDM signal and calculating a first comparison metric from signal samples of the OFDM signal corresponding to a first set of resource elements of the OFDM signal, and calculating a second comparison metric from signal samples of the OFDM signal corresponding to a second set of resource elements of the OFDM signal. The method continues with determining whether the reference signal is or is not muted for the given transmission time, by comparing the first and second comparison metrics, and foregoing or performing reference signal measurements responsive to determining that the reference signal is or is not muted.

20 Claims, 5 Drawing Sheets

(56) References Cited

U.S. PATENT DOCUMENTS

| | | |
|---|---|---|
| 2007/0223406 A1* | 9/2007 | Li et al. .................. 370/278 |
| 2007/0280366 A1 | 12/2007 | Aytur et al. |
| 2007/0281649 A1 | 12/2007 | Maeda et al. |
| 2010/0172309 A1* | 7/2010 | Forenza et al. ............ 370/329 |
| 2012/0327984 A1* | 12/2012 | Krishnamurthy et al. .... 375/219 |

OTHER PUBLICATIONS

3RD Generation Partnership Project. "UE Considerations for Autonomous Muting in DL OTDOA." 3GPP TSG-RAN Ad-Hoc Meeting #2, R4-101322, Dublin, Ireland, Apr. 12-16, 2010.

3RD Generation Partnership Project. "Introduction to 4C-HSDPA." 3GPP TSG RAN WG1 Meeting #60bis, R1-101999, Beijing, China, Apr. 12-16, 2010.

Motorola, "Autonomous Muting in DL OTDOA", 3GPP TSG RAN meeting #47, Vienna, Austria, Mar. 12, 2010, pp. 1-2, RP-100190, 3GPP.

Pantech & Curitel, "Muting for LTE Rel-9 OTDOA Positioning", 3GPP TSG RAN WG1 Meeting #58-bis, Miyazaki, Japan, Oct. 12, 2009, pp. 1-6, R1-093793, 3GPP.

Motorola, "On Serving Cell Muting for OTDOA Measurements", 3GPP TSG RAN1 #57, Los Angeles, CA, USA, Jun. 29, 2009, pp. 1-7, R1-092628, 3GPP.

3RD Generation Partnership Project, "LTE; Evolved Universal Terrestrial Radio Access (E-UTRA); Physical channels and modulation", Technical Specification, 3GPP TS 36.211 version 10.0.0 Release 10, ETSI TS 136 211 V10.0.0, Jan. 1, 2011, pp. 1-105, ETSI, France.

3RD Generation Partnership Project, "3rd Generation Partnership Project; Technical Specification Group Radio Access Network; Evolved Universal Terrestrial Radio Access (E-UTRA); LTE Positioning Protocol (LPP) (Release 9)", Technical Specification, 3GPP TS 36.355 V9.1.0, Mar. 1, 2010, pp. 1-111, 3GPP, France.

* cited by examiner

METHOD AND APPARATUS FOR REFERENCE SIGNAL MUTING DETECTION IN A WIRELESS COMMUNICATION NETWORK

FIELD OF THE INVENTION

The present invention relates in general to improved measurements in wireless communications networks and in particular to wireless network architectures that utilize signal measurements from multiple cells for positioning, location and location-based services.

BACKGROUND

The possibility of identifying user geographical location in the network has enabled a wide variety of commercial and non-commercial services, including navigation assistance, social networking, location-aware advertising, emergency calls, etc. Different services may have different positioning accuracy requirements imposed by the application. In addition, certain regulatory requirements on the positioning accuracy for basic emergency services exist in some countries, i.e., FCC requirements for E911 calls in the United States.

In many environments, the position can be accurately estimated by using positioning methods based on GPS (Global Positioning System). Nowadays networks also often have the possibility to assist user equipment ("UEs"), to improve their receiver sensitivities and GPS startup performance. Such assistance procedures are referred to as Assisted-GPS positioning, or A-GPS. GPS or A-GPS receivers, however, may not necessarily be available in all wireless terminals. Furthermore, GPS-based positioning often fails in indoor environments and urban canyons because of poor GPS reception in such circumstances. A complementary terrestrial positioning method, called Observed Time Difference of Arrival (OTDOA), has therefore been standardized by the Third Generation Partnership Project (3GPP).

In accordance with OTDOA-based positioning, a UE measures the timing differences for downlink reference signals received from multiple distinct locations, e.g., from multiple cells in a wireless communication network. For each (measured) neighbor cell, the UE measures a Reference Signal Time Difference (RSTD), which is the relative timing difference between a neighbor cell and a reference cell. The UE position estimate is then found as the intersection of hyperbolas corresponding to the measured RSTDs. At least three measurements from geographically dispersed base stations with a good geometry are needed to solve for two coordinates of the terminal and the receiver clock bias.

Precise knowledge of the transmitter locations and transmit timing offset are needed to solve for the UE's position. Position calculation can be conducted, for example, by a positioning server in the network, e.g., an E-SMLC in a Long Term Evolution (LTE) network, or the UE may carry out at least a portion of the calculations. The former approach corresponds to the UE-assisted positioning mode, whilst the latter corresponds to the UE-based positioning mode.

To enable positioning in LTE and facilitate positioning measurements of a proper quality and for a sufficient number of distinct locations, new physical signals dedicated for positioning have been introduced and low-interference positioning sub-frames have been specified in 3GPP. The new physical signals dedicated for positioning measurement are referred to as "positioning reference signals" or PRSs.

Conventionally, for a given cellular network transmitter, PRSs are transmitted from one antenna port (R6) according to a pre-defined pattern. For example details on PRS patterns, see section 1.1.2 of the Technical Specification identified as 3GPP TS 36.211, "Evolved Universal Terrestrial Radio Access (E-UTRA); Physical Channels and Modulation", v9.1.0, 2010-03-30 (hereafter "TS 36.211"). As a particular approach to patterning, a frequency shift that is a function of Physical Cell Identity (PCI) can be applied to the specified PRS patterns, to generate orthogonal patterns modeling an effective frequency reuse of six. Doing so makes it possible to significantly reduce neighbor cell interference on the measured PRSs and thus improve positioning measurements.

Even though PRSs have been specifically designed for positioning measurements and in general are characterized by better signal quality than other reference signals, the standard does not mandate using PRS. Other reference signals, e.g. cell-specific reference signals (CRSs), therefore, at least in principle, can be used for positioning measurements. However, as noted, PRSs are dedicated for use in making positioning measurements.

PRSs are transmitted in pre-defined positioning sub-frames grouped by several consecutive sub-frames $N_{PRS}$, which constitute one positioning occasion. Positioning occasions occur periodically with a certain periodicity of N sub-frames. That is, the time interval between two positioning occasions defines the periodicity of positioning occasions, specified in the number of transmission sub-frames. The standardized periods N are 160, 320, 640, and 1280 ms, and the number of consecutive sub-frames are 1, 2, 4, and 6.

Further, as previously noted, Section 1.1.1 of TS 36.211 provides that PRSs are transmitted within a given LTE network cell from one antenna port (R6) in accordance with a pre-defined pattern. The currently specified PRS patterns may be understood in terms of the resource elements (REs) within a block of 12 subcarriers over 14 OFDM symbols (1 ms sub-frame with normal cyclic prefix).

A set of frequency shifts can be applied to the predefined PRS patterns to obtain a set of orthogonal patterns which can be used in neighbor cells to reduce interference on the PRSs and thus improve positioning measurements. That is, these techniques, which model an effective frequency reuse of six, reduce PRS interference between cells and thereby improve the quality of PRS measurements made by any given UE with respect to the PRSs being transmitted for a given cell. As for the frequency-shift based reuse, the frequency shift is defined as a function of Physical Cell ID (PCI) as follows:

$$v_{shift} = \mathrm{mod}(PCI, 6).$$

Figure 1:
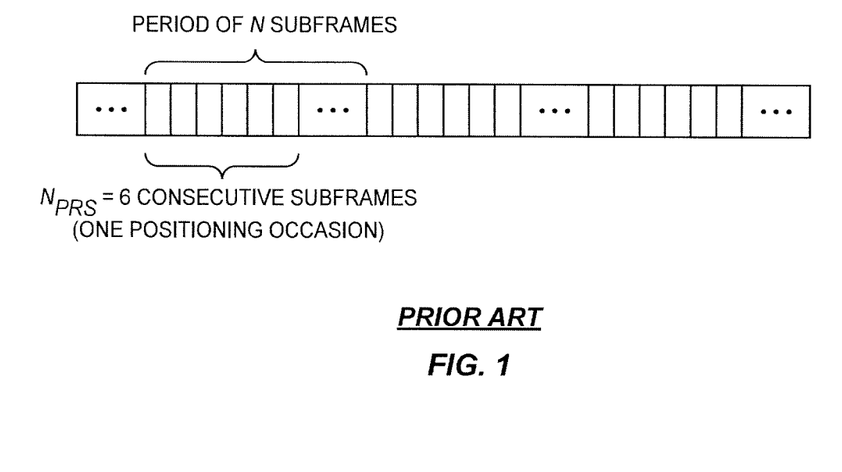
FIG. 1 is a diagram of a known technique for defining positioning occasions as a periodically occurring subset of sub-frames, in which a transmitter transmits positioning reference signals (PRSs), for use by receiving radio equipment in making positioning-related timing measurements.
Figure 2:
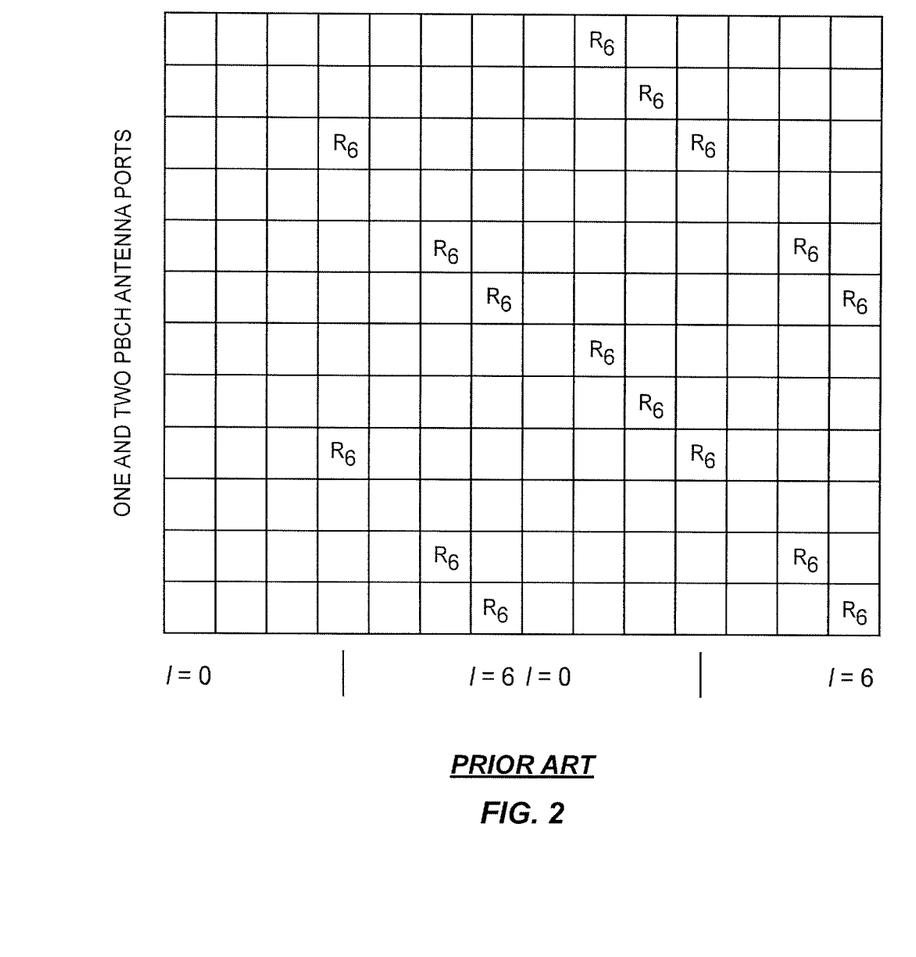
FIG. 2 is a diagram of a PRS pattern over one resource block.

Notably, PRSs from any given cell can be muted for all or part of a given positioning occasion. Such muting constitutes transmitting the PRSs at zero or substantially-reduced power (as compared to non-muted transmission powers). See FIG. 2 for an example illustration of frequency shifting and see 3GPP TS 36.355, "Evolved Universal Terrestrial Radio Access (E-UTRA); LTE Positioning Protocol (LPP)", v9.0.0, 2010-01-05 (further referred to as "TS 36.355"), for more muting details.

To improve detection of PRS, i.e. to allow for detecting PRS from multiple sites and at a reasonable quality, positioning sub-frames have been designed as low-interference sub-frames (LIS) and data transmissions are suppressed in general in positioning sub-frames. This approach means PDSCH shall not be transmitted to the UE during the PRS sub-frames. The result is that in synchronous networks, PRSs are ideally interfered with only by PRSs from other cells having the same PRS pattern index (i.e. same vertical shift, $v_{shift}$) and not by the data transmissions.

In addition to the use of LIS, PRSs can also be transmitted during the sub-frames configurable for the Mobile Broadcast Single Frequency Network (MBSFN). These sub-frames do not contain user data, and only the first 2 OFDM symbols in each MBSFN sub-frame may contain common control channels (e.g., PDCCH) or physical signals (e.g., CRS). In LTE, up to 6 downlink sub-frames in a frame can be configured for the MBSFN. Due to no data transmissions, the interference is reduced in these sub-frames.

In the case of both LIS and MBSFN sub-frames, an important observation is that there exist REs whereby there are: (a) resource elements exclusively for PRS ($RE_{PRS}$); (b) resource elements with non PRS signals ($RE_{NON-PRS}$); and (c) resource elements which are completely empty or unused ($RE_{UNUSED}$). Note that the unused REs, $RE_{UNUSED}$, may be considered as a subset of the non-PRS REs, $RE_{NON-PRS}$.

In partially aligned asynchronous networks, PRSs can still be interfered with by transmissions over data channels, control channels or any physical signals when positioning sub-frames collide with normal sub-frames. This effect is minimized by partial alignment, i.e. by aligning the beginning of positioning sub-frames in multiple cells within one-half of a sub-frame with respect to some time base. Furthermore, in practice, interference on PRS REs may also be caused by other factors such as poor synchronization or large delay spread.

In any case, in using PRSs for OTDOA positioning, a UE may have to deal with PRSs from a neighboring cell that are much weaker than those received at the UE from its own (serving) cell. Furthermore, without the approximate knowledge of when the PRSs are expected to arrive in time and according to what pattern, the UE is obligated to perform signal searching within a large time and/or frequency window, which negatively impacts the time and accuracy of PRS measurements and increases UE complexity.

To facilitate PRS measurements by UEs, the network transmits assistance data, which includes, among other things, reference cell information, a neighbor cell list containing the PCIs of neighbor cells, the number of consecutive downlink sub-frames, PRS transmission bandwidth, frequency, etc. Of course, as noted, the PRSs in any given cell may be muted at given positioning occasions. If a given cell mutes its PRS transmissions for given positioning occasions, that muting generally applies for all PRS REs within the same sub-frame over the entire PRS transmission bandwidth.

On this point, certain optional signaling regarding muting is specified in TS 36.355, but there is no standardized muting pattern. Further, it remains open whether such signaling will be applicable to asynchronous networks. Still further, the possibilities for coordinated muting among transmitting nodes are limited. Thus, the contemplated muting signaling may not be very helpful, for example, for home eNodeBs.

Additionally, the use of blank subframes for "hetnets" (heterogeneous networks) and related signaling is not defined, and there is the possibility that PRS muting pattern is masked by the general hetnet pattern. As a further complication, it is worth noting that hetnet-related muting or puncturing can be applied not only over certain subframes, but also in frequency over certain subframes. Further, muting has been specified as a non-critical extension for Rel-9, meaning that there may be Rel-9 UEs that do not support muting signaling.

In principle, PRS muting can also be applied on OFDM symbol basis. This implies that the PRS muting need not be applied in all of the OFDM symbols in the sub-frame. However, all PRS REs within an OFDM symbol are muted. According to the current formulation presented in 3GPP TS 36.213, "Evolved Universal Terrestrial Radio Access (E-UTRA); Physical layer procedures", v9.1.0, 2010-03-30, (further referred to as "TS 36.213"), the PRS muting shall be applied only on a positioning occasion basis (i.e., it is proposed that the transmit power on PRS will be constant over the positioning occasion). However, as noted, the hetnet pattern may not follow the PRS pattern, and, in general, muting may be applied on a sub-frame basis, or even decided at the symbol level. Furthermore, positioning measurements are not required to be performed on PRS, they may be performed, for example, on CRS or other signals for which no muting information may be signaled at all.

A muted PRS or punctured RE is similar to a non-scheduled RE or otherwise "empty" RE. Because of imperfections in signal transmission, reception, and processing, and because of interference and other impairments, even a non-scheduled PRS RE transmits noise. However, even allowing for interference noise power, the transmit power level of a PRS RE when PRS muting is applied is typically well below the transmit power level of a PRS RE when PRS muting is not applied. For instance, the difference between the un-muted and muted PRS levels can be in the order of 30 dB (especially for hetnet).

Muting or puncturing may also be random, where each cell (eNodeB) selectively mutes its PRS transmissions, and where the decision to mute or not is made with some probability. In a simple implementation of random muting, neighboring eNodeBs do not coordinate their muting decisions. The probability at which any given eNodeB makes its selective muting decisions may be statically configured. One advantage of this approach is that no coordination signaling is needed among eNodeBs, as the muting decisions are made locally for each eNodeB or cell. One disadvantage is that real networks are inhomogeneous, with different cell coverage areas and user densities, and possibly different types of base stations. The optimal configuration of such probabilities may also vary, for example, over the day and over the week and on the cell basis, which makes static configurations not the best option from the practical point of view.

These variations imply that setting optimal muting probabilities is a tedious task. Furthermore, there may be multiple patterns in the network (e.g. PRS pattern and hetnet pattern). Even if optimal muting probabilities could be set or maintained for the eNodeBs, the UEs operating in the corresponding cells of the network would not be appraised of the muting decisions. As such, a given UE would not know whether the PRS from a given cell is or is not muted for any given positioning occasion. Without such knowledge, the UE does not know whether to make PRS measurements with respect to that cell, which adds to UE complexity and can degrade PRS measurement results.

One approach that addresses at least some of the issues, including random muting, involves designing a limited set of muting patterns and mapping the muting pattern IDs to PCIs. This approach offers the advantage of providing a table of muting patterns and PCI in the assistance information, meaning that a UE can use the assistance information to determine when the PRSs in a given cell of interest are muted. As a disadvantage of this approach, however, the muting patterns either need to be hard coded in the UEs or received from the network.

The first solution is not appropriate for all UEs, e.g., older UEs and any Rel-9 UEs that do not implement support for muting signaling, while the second solution adds to the signaling requirements of the network. In any case, mapping muting patterns to PCIs will most likely not result in an optimal muting configuration in non-uniform real networks that may also have a multi-layer structure. In other words, with this approach, the muting configuration is fixed and is impossible to re-optimize unless PCI planning is redesigned for the entire network specifically to complement positioning, which likely is not a top priority from the network operator's perspective.

One state-of-the-art approach to blind detection uses correlation principles to detect the presence or absence of a known reference or pilot signal. According to this process, a UE correlates the received signal with all possible pre-defined reference signal waveforms and compares the correlation result to an absolute threshold. No selective measurement over subframes or symbols or REs is performed, to exclude certain PRS REs within the total measured interval. Low correlation indicates that the signal is absent, i.e., not transmitted within the considered search window.

If the comparison is made based on (coherent and/or non-coherent) accumulations over all measured sub-frames over the entire measured interval, then muting detection is essentially the same as the classical signal detection. When the muting pattern is not known to the UE and the measured signal can be muted in shorter intervals, i.e. the muting may occur in some sub-frames and may not occur in the other sub-frames within the same measured interval, then with the state of art, the signal would still be accumulated over the entire measurement interval even though in some sub-frames the signal is not present. With a known muting pattern or a known set of punctured REs, the non-present PRS REs may be excluded from the correlation, but without this knowledge and with a full muting flexibility (e.g., when muting can be applied in any sub-frame or its part, any part of the bandwidth in the muted sub-frame and during any time interval) the UE would be obligated to implement blind detection of muting for any such sub-frame, bandwidth or their parts.

This implies that the advantage of signal accumulation, which increases the correct detection probability and is necessary at low Signal-to-Interference Ratios (SINRs) when the detection probability is low, cannot be exploited if flexible muting is in use by the network—unless, of course, the UEs are appraised of the muting patterns in use. This problem is exacerbated in the sense that a given UE must reliably detect and measure PRSs from multiple cells (e.g., even more than the theoretically-required three cells).

Thus, while signal accumulation improves correlation detection performance, it is, in practice, difficult for the UE to maintain an appropriate absolute threshold for evaluating the correlation results. Hence, non-muted portions of the PRSs or more specifically the resource elements in which the PRS is not muted may be mistakenly identified or detected or estimated by the UE or the target device as being muted, or vice versa. These mistakes or detection errors degrade the PRS measurements and, correspondingly, the accuracy of positioning determinations.

SUMMARY

In one embodiment, the present invention provides a method in a radio apparatus of autonomously detecting whether a reference signal within an OFDM signal transmitted by a remote transmitter is muted or punctured for a given transmission time. The method includes receiving the OFDM signal and calculating a first comparison metric from signal samples of the OFDM signal corresponding to a first set of resource elements of the OFDM signal, and calculating a second comparison metric from signal samples of the OFDM signal corresponding to a second set of resource elements of the OFDM signal. The first set of resource elements corresponds to, for example, those resource elements in the received OFDM signal that would convey the reference signal within the given transmission time, unless muting is applied by the remote transmitter for such time. Correspondingly, the second set of resource elements do not carry such reference signals for the given transmission time, irrespective of whether muting is or is not applied for the given transmission time.

The method continues with determining whether the reference signal is or is not muted for the given transmission time by making a comparison of the first and second comparison metrics. Further, the method includes performing reference signal measurements responsive to determining that the reference signal is not muted, or forgoing reference signal measurements, for the reference signal in its entirety, or at least for the reference signal resource elements that are determined to be muted. As the remote transmitter may mute only a portion of the reference signal, i.e., puncture it at the transmitter or transmit at a reduced power, the receiver may determine whether muting is or is not applied to different portions of the reference signal, and then make or forego reference signal measurements in dependence on whether a given portion of the reference signal was or was not determined to be muted. In this regard, a "portion" of the reference signal may be particular (OFDM) resource elements of the reference signal to which muting has been applied.

Another aspect of this disclosure provides a radio apparatus including a communication transceiver configured to receive an OFDM signal from a remote transmitter. The OFDM signal includes a reference signal that may or may not be muted for a given transmission time. In turn, the radio apparatus advantageously is configured to autonomously detect whether the reference signal is or is not muted for the given transmission time. (Unless otherwise indicated herein, determining whether the remote transmitter did or did not apply muting to the reference signal encompasses determining whether the remote transmitter did or did not apply puncturing.) Supporting this configuration, the radio apparatus includes: a measurement circuit configured to calculate a first comparison metric from signal samples of the OFDM signal corresponding to a first set of resource elements of the OFDM signal, and to calculate a second comparison metric from signal samples of the OFDM signal corresponding to a second set of resource elements of the OFDM signal; an evaluation circuit configured to determine whether the reference signal is or is not muted for the given transmission time, by making a comparison of the first and second comparison metrics; and a processing circuit configured to perform reference signal measurements responsive to said evaluation circuit determining that the reference signal is not muted, and to forgo reference signal measurements, for the whole reference signal, or at least for those reference signal resource elements determined to be muted.

Of course, the present invention is not limited by the foregoing brief summary of certain of its advantages and features. Those of ordinary skill in the art will recognize further advantages and features upon reading the following description and upon viewing the drawings.

BRIEF DESCRIPTION OF THE DRAWINGS

FIGS. 6 and 7 are logic flow diagrams illustrating example variations for the processing outlined in FIG. 5, and, in particular, FIG. 6 illustrates a power measurement based approach to autonomous muting detection while FIG. 7 illustrates a correlation results based approach to autonomous muting detection.

DETAILED DESCRIPTION

Figure 3:
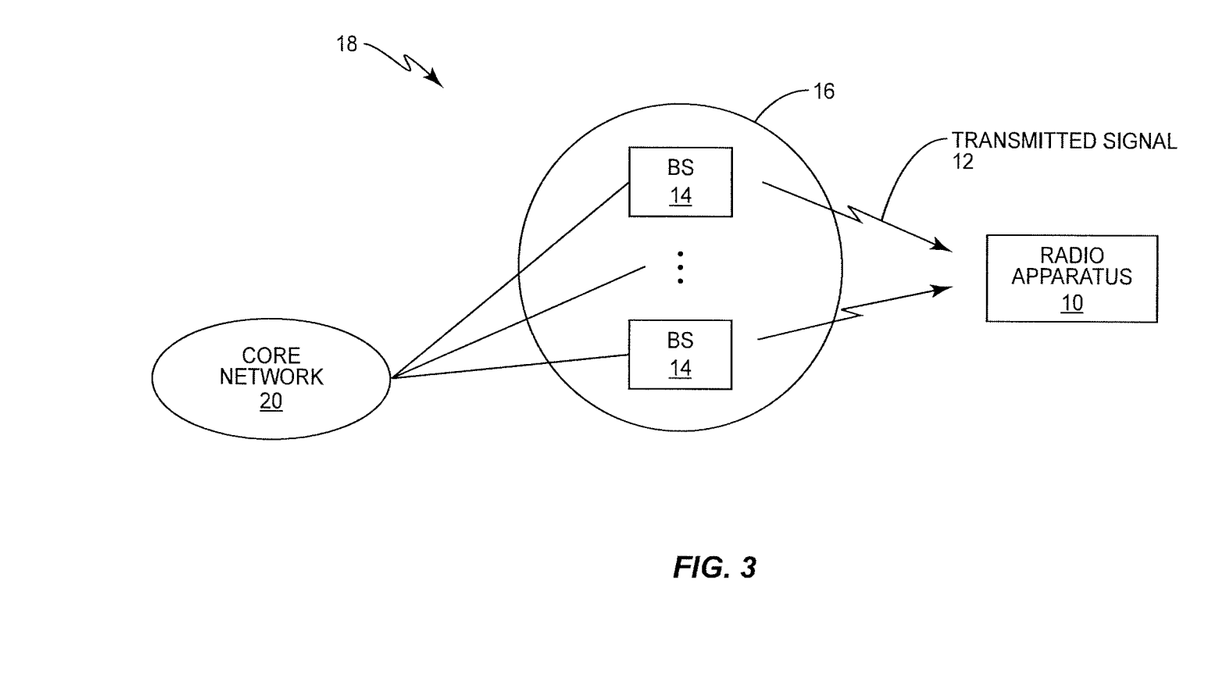
FIG. 3 is a block diagram illustrating an example embodiment of a radio apparatus configured to communicate with a supporting wireless communication network, wherein the radio apparatus receives one or more kinds of reference signals from network transmitters, and is configured to autonomously detect muting of those signals.

FIG. 3 illustrates a radio apparatus 10 receiving transmitted signals 12 from each of one or more base stations 14 within a Radio Access Network (RAN) 16. More generally, the base stations 14 are part of a wireless communication network 18 that includes the RAN 16 and a core network (CN) 20. As a non-limiting example, the wireless communication network 18 is an LTE-based communications network and the radio apparatus 10 is a user equipment or UE. However, the disclosed teachings are applicable to any radio node, e.g., the radio apparatus 10 may be a small base station. Those of ordinary skill in the art will also appreciate that the depicted base stations, eNodeBs in LTE embodiments, can support a potentially large plurality of UEs, and that the wireless communication network 18 may include other elements that, for simplicity, are not illustrated.

Each base station 14 may be associated with more than one cells or sectors of the RAN 16, but, for a simplified discussion, each base station 14 may be considered to correspond to a cell within the RAN 16. In this respect, each base station 14 transmits one or more types of reference signals, e.g., Cell-specific Reference Signals (CRS), which may carry or be tied to the Physical Cell Identify (PCI) of the cell within the RAN 16. Additionally, or alternatively, each base station 14 transmits Positioning Reference Signals or PRSs, which are dedicated for positioning-related measurements by UEs or other receiving equipment. With respect to FIG. 3, one sees that the radio apparatus 10 may receive reference signals from multiple base stations 14 (i.e., from multiple cells). More particularly, the radio apparatus 10 may receive reference signals from a serving cell and one or more neighboring cells.

Figure 4:
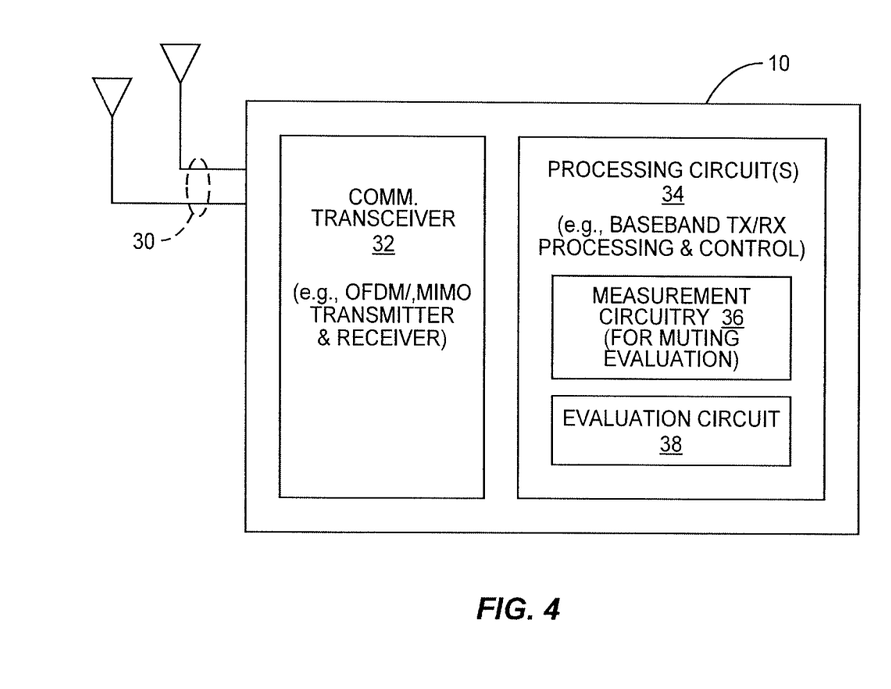
FIG. 4 is a block diagram illustrating example circuits for the radio apparatus of FIG. 3.

To better understand the configuration advantages of the radio apparatus 10, as contemplated herein with respect to reference signal measurements and, in particular, with respect to autonomously determining when a reference signal from a given transmitter is or is not muted, FIG. 4 provides a diagram of the radio apparatus 10 with further example details. According to the illustration, the radio apparatus 10 comprises one or more antennas 30 (which may be used for transmitting and receiving), a communications transceiver 32, one or more processing circuits 34, which at least functionally include measurement circuitry 36 and an evaluation circuit 38.

The communication transceiver 32 is configured to receive an OFDM signal from a remote transmitter—e.g., from any one or more of the base stations 14 in the network 18. The OFDM signal includes reference signals that have or have not been selectively muted for a given transmission time. In this regard, those skilled in the art will appreciate that the term "OFDM signal" as used here refers to all or at least a portion of the aggregation of narrowband, spaced-apart subcarriers used to form an overall OFDM signal of a certain bandwidth. More particularly, those of ordinary skill in the art will appreciate that such an OFDM signal can carry a plurality of "signals" within its aggregate set of time-frequency resources, and that each subcarrier frequency at a given transmission time may be considered a Resource Element (denoted as "RE" herein). Thus, one OFDM "symbol" corresponds to the REs included in the OFDM signal over all or a portion of the OFDM signal's bandwidth, for a given transmission slot or sub-slot. Each such RE can be used to convey a symbol, which may comprise data signaling, control signaling, or reference signaling, or the RE may be unused (sometimes referred to as "empty").

Of particular interest herein is that a given base station 14 may be configured to transmit a reference signal within its transmitted OFDM signal, at least at defined reference signal occasions, which may recur periodically. More particularly, the particular REs within the OFDM signal that are used by the base station 14 for reference signal transmission may be statically defined, or dynamically defined, e.g., according to a muting pattern or sequence, and the overall muting configuration of the base station 14 may provide for muting. With muting, the base station 14 selectively applies muting to the reference signal—i.e., the reference signal is muted in some positioning occasions but not in others. Muting may be controlled according to a muting pattern that defines when muting is to be applied by the base station 14.

Thus, the OFDM signal at a given transmission time includes REs that will carry the reference signal or not, in dependence on whether the base station 14 has or has not applied muting. The OFDM signal will also carry REs that are not used for reference signal transmission, at least for the given transmission time, and therefore do not carry the reference signal irrespective of whether muting is or is not applied. Advantageously, the radio apparatus 10 is configured to autonomously determine whether or not a reference signal is or is not muted for any given transmission time, with respect to any given base station 14 from which it receives a (downlink) OFDM signal.

In support of this configuration, the measurement circuitry 36 is configured to calculate a first comparison metric from signal samples of the OFDM signal corresponding to a first set of resource elements of the OFDM signal, and to calculate a second comparison metric from signal samples of the OFDM signal corresponding to a second set of resource elements of the OFDM signal. In other words, subject to initial received signal processing (e.g., filtering, downconversion, digitization, IFFT processing, etc.), the measurement circuitry 36 uses signal samples corresponding to particular first REs of the OFDM signal to determine the first comparison metric, and uses signal samples corresponding to particular second REs of the OFDM signal to determine the second comparison metric.

Correspondingly, the evaluation circuit 38 is configured to determine whether the reference signal is or is not muted for the given transmission time by making a comparison of the first and second comparison metrics. Further, the one or more processing circuits 34 are configured to perform reference signal measurements responsive to the evaluation circuit 38 determining that the reference signals are not muted, and to forgo reference signal measurements responsive to said evaluation circuit determining that the reference signals are muted.

Of course, those ordinarily skilled in the art will appreciate that the disclosed circuit arrangement for the radio apparatus 10 is provided by way of example, rather than limitation, and that the depicted circuits may represent a functional arrangement, rather than a physical circuit arrangement. In other words, an apparatus according to the present invention includes logic (e.g., one or more types of digital processing circuitry) that is configured to carry out the present invention, and that configuration may be based on various processing and measurement circuit arrangements.

In this regard, the radio apparatus 10 is implemented using fixed or programmable circuits, or any combination thereof. In at least one embodiment, the radio apparatus 10 includes memory or another computer-readable medium that stores computer program instructions for execution by one or more digital processors within the radio apparatus 10. In particular, in at least one embodiment, the radio apparatus 10 comprises one or more computer circuits, based on microprocessors, DSPs, or the like. Accordingly, such programmable processing circuits are specially adapted to perform the method(s) disclosed herein, according to their execution of the stored computer program instructions.

Turning back to example configuration details, in one embodiment, the first set of resource elements correspond to certain ones among a plurality of subcarriers of the OFDM signal, taken at defined symbol times, and the second set of resource elements correspond to certain other ones among the plurality of subcarriers, taken at the same or at other defined symbol times. For example, the first set of REs is known or otherwise expected to carry the reference signal of interest, subject, of course, to the selective muting action of the transmitting base station 14, and the second set of REs is known or otherwise expected not to carry the reference signal of interest.

In this regard, the first set of REs may be designated as $RE_{RS}$, to denote that they are the resource elements of the OFDM signal that the base station 14 would use to transmit the reference signal of interest, if the base station 14 is not applying muting to the reference signal for the given transmission time. Conversely, the second set of REs may be designated as $RE_{NON-RS}$, to denote that they are resource elements of the OFDM signal that would not carry the reference signal of interest for the given transmission time, irrespective of whether the base station 14 is or is not applying muting. Thus, in at least one embodiment, one of the first and second sets of REs comprise REs corresponding to a predefined reference signal pattern associated with the base station 14, or whatever remote transmitter is involved.

Figure 5:
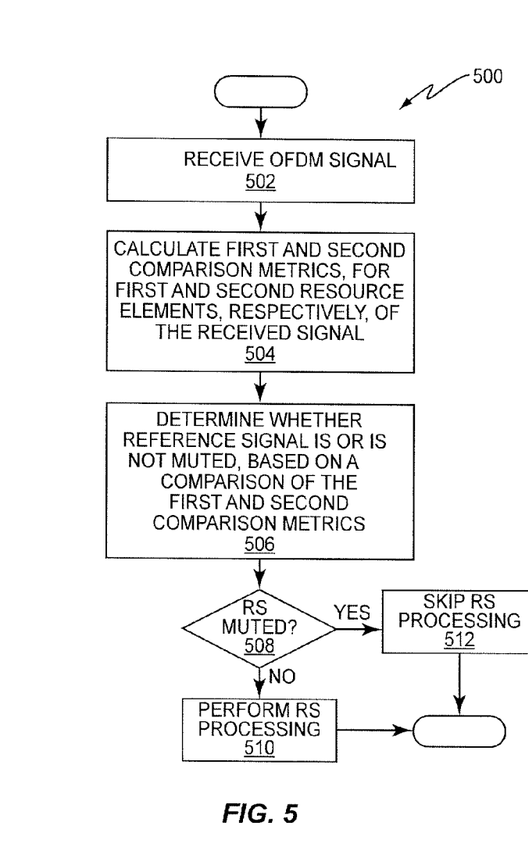
FIG. 5 is a logic flow diagram illustrating an example processing method for autonomously detecting reference signal muting, wherein the method may be implemented by the radio apparatus of FIG. 3 or 4.

Turning to FIG. 5, one sees a method 500 in a radio apparatus of autonomously detecting whether a reference signal within an OFDM signal transmitted by a remote transmitter has or has not been selectively muted for a given transmission time. As an example, in one or more embodiments, the radio apparatus 10 of FIG. 4 is configured to carry out the method 500 of FIG. 5. This configuration is accomplished, for example, by storing (in non-volatile memory or another computer-readable medium included in the radio apparatus 10) computer program instructions that configure the processing circuits 34 of the radio apparatus 10 to carry out the method 500 of FIG. 5.

That method includes receiving an OFDM signal (carried on a plurality of resource elements) (Block 502), and continues with calculating first and second comparison metrics (Block 504). In particular, the first comparison metric is calculated from signal samples of the OFDM signal corresponding to a first set of resource elements of the OFDM signal, and the second comparison metric is calculated from signal samples of the OFDM signal corresponding to a second set of resource elements of the OFDM signal. Here, "calculated from" indicates a calculation that directly or indirectly depends on the involved signal samples, and it will be understood that the radio apparatus 10 is configured to perform IFFT or other such processing, to produce signal sample values corresponding to the symbol modulations carried on the different subcarriers of the OFDM signal at any given OFDM symbol time.

The illustrated processing continues with determining whether a reference signal is or is not muted, based on a comparison of the first and second comparison metrics (Block 506). If the reference signal (RS) is determined to be muted (YES from Block 508), the processing continues with skipping RS processing (Block 512). If the RS is determined not to be muted (NO from Block 508), the processing continues with performing RS processing (Block 510). Here, performing RS processing means, for example, making received signal strength, timing, or other such measurements for the RSs from a given base station 14. Also, please note that skipping RS processing in the context of Block 512 means skipping RS signal measurements or other such processing at least for those portions of the RS that are determined to be muted for the given transmission time.

To the extent that certain "portions" (e.g., OFDM resource elements) of the RS signal are not muted, while others are, for a given transmission time, measurements may be performed on the unmuted portions. Also, it will be understood that the skipping decision is "local," i.e., specific to that particular base station 14, for that particular reference signal transmission occasion. Thus, it should be understood that the radio apparatus 10 may skip RS measurements for one base station 14 but make RS measurements for another base station 14.

Figure 6:
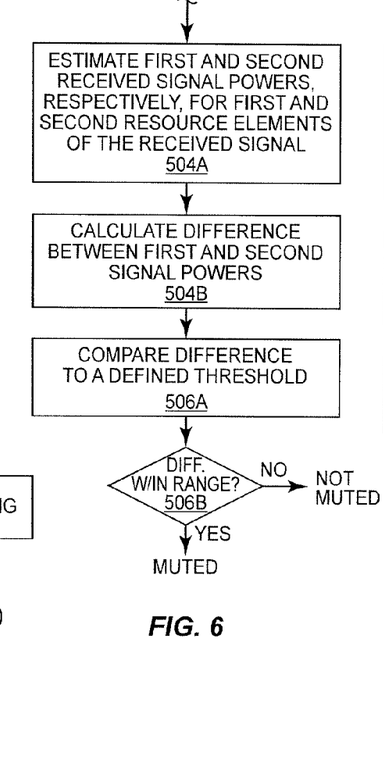

FIG. 6 illustrates one embodiment of carrying out the processing broadly disclosed in Blocks 504 and 506 of FIG. 5. In particular, FIG. 6 illustrates an approach where the first and second comparison metrics are power-related.

According to the details of FIG. 6, for example, the measurement circuitry 36 of the radio apparatus 10 is configured to calculate the first comparison metric by estimating a first received signal power from the signal samples of the OFDM signal corresponding to the first set of resource elements of the OFDM signal. Similarly, the second comparison metric is calculated by estimating a second received signal power from the signal samples of the OFDM signal corresponding to the second set of resource elements of the OFDM signal (Block 504A). Once these power estimates are determined, the measurement circuitry 36 calculates the difference between the first and second signal powers—that is, the circuitry determines the difference between the received signal power as estimated for the first resource elements of the received OFDM signal and the received signal power as estimated for the second resource elements of the received OFDM signal (Block 504B).

Processing continues with the radio apparatus 10 (e.g., the evaluation circuit 38) determining whether the reference signal is or is not muted for the given transmission time by determining a power difference between the first and second received signal powers (Block 506A) and determining whether that difference is within a defined range (Block 506B).

In at least one such embodiment, the radio apparatus 10 is configured to determine that the reference signal is muted if the power difference is within a defined range, and otherwise to determine that the reference signal is not muted. As a broad example, the radio apparatus 10 logically concludes the reference signal is muted if the received signal power for REs that do not carry the reference signal irrespective of muting is the same or about the same as the received signal power of the REs that do carry reference signals (unless muting has been applied by the transmitter). The threshold may be preconfigured and stored in memory, or may be dynamically determined, scaled, or otherwise adjusted by the radio apparatus 10 during live operation.

In any case, those skilled in the art will recognize that the "defined range" can be stored and represented as a numeric value and that determining whether the reference signal is or is not muted can be carried out by evaluating whether the difference between the first and second received signal powers does or does not exceed the stored threshold value. Further, it is noted that this embodiment, i.e., the comparison of received signal powers, is particularly advantageous for the case where one set of resource elements is known or expected to carry the reference signal (subject, of course, to selective muting), and the other set of resource elements is unused, at least for the transmission time of interest. As "unused" resource elements are unmodulated or otherwise empty, the received signal power for the unused REs provides an excellent reference point for the expected received signal power of reference signal REs for the case where muting is active. Thus, in at least one embodiment, the radio apparatus 10 is configured to select the first set of REs as those that are supposed to carry the reference signal (but which may be muted for this particular occasion) and to select the second set of resource elements as REs that are unused resource elements, at least for the given transmission time.

Figure 7:
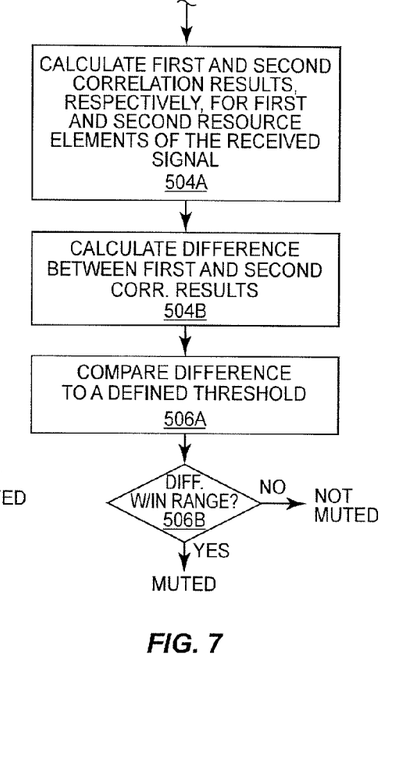

FIG. 7 illustrates yet another embodiment for the processing broadly disclosed in Blocks 504 and 506 of FIG. 5. As compared to the received signal power determinations of FIG. 6, the processing of FIG. 7 illustrates a correlation-based approach to determining the first and second comparison metrics. In particular, the measurement circuitry 36 of the radio apparatus 10 is configured to calculate the first comparison metric based on determining first correlation results by correlating the OFDM signal as received on the first set of resource elements with a known reference signal pattern, and to calculate the second comparison metric based on determining second correlation results by correlating the OFDM signal as received on the second set of resource elements with the known reference signal pattern (Block 504A). Further, according to the illustrated processing, the radio apparatus 10 calculates the difference between the first and second correlation results (Block 504B), and compares that difference to a defined threshold (Block 506A).

According to Block 506B, if the difference is within a certain range (e.g., less than or equal to the defined threshold), the radio apparatus 10 deems the reference signal to be muted. If the difference is not within the defined range, the radio apparatus deems the reference signal not to be muted.

Thus, in one or more embodiments, the evaluation circuit 38 or another processing element of the radio apparatus 10 is configured to determine whether the reference signal is or is not muted for the given transmission time, by evaluating a difference between the first and second correlation results. In this regard, the radio apparatus 10 at least temporarily stores data representing the known or expected signal waveform, data, or some other characteristic pattern that defines the reference signal. As such, the radio apparatus 10 correlates the signal waveforms or data received on the first resource elements of the OFDM signal with the known reference signal pattern, to compute the first correlation results. Likewise, the radio apparatus performs a separate correlation of the signal waveforms or data received on the second resource elements of the OFDM signal with the known reference signal pattern.

If the two correlation results are the same or similar, then the difference obtained by subtracting them will be zero or a relatively small value. Indeed, the smaller the difference value between them, the more alike are the two correlation results. Conversely, the greater the difference between the results, the more dislike are the two correlation results.

In particular, assume the first set of REs carries the reference signal and assume that the signal is not muted. Further, assume that the second set of REs do not carry the reference signal (i.e., no component of the reference signal is conveyed by any RE in the second set). With these assumptions, correlating the received signal waveforms or data for the first set of REs with the known reference signal pattern will yield a very high correlation result (e.g., a correlation of "1"), while correlating the received signal waveforms or data for the second set of REs with the known reference signal pattern will yield a very low correlation result (e.g., a correlation of "0"). Thus, the difference between the two correlation results will be low when neither the first nor the second set of resource elements are carrying the characteristic reference signal pattern, but that difference will be high when one set is and the other is not. (The correlations may be done in the time domain and/or in the frequency domain.)

For these and other embodiments, it will be understood that the radio apparatus 10 may be configured to receive control signaling that indicates which resource elements of the OFDM signal to use as the non-reference signal REs. Additionally, or alternatively, the radio apparatus 10 is configured to determine which resource elements of the OFDM signal to use as the non-reference signal REs based on one of: determining a sampling pattern that dictates which elements are used as said second set of resource elements, based on evaluating interference in the OFDM signal; and determining a sampling pattern that dictates which elements are used as said second set of resource elements, based on shifting a known resource element allocation pattern used for transmitting the reference signal.

Further, in at least one embodiment, the radio apparatus 10 is configured to set a detection threshold used for autonomously detecting whether reference signal transmitted by another remote transmitter is or is not muted, based on the values calculated for the first and second comparison metrics. Here, "another" remote transmitter refers to, for example, a neighboring base station in the network 18. Additionally, in one or more embodiments, the radio apparatus 10 is configured to make a comparison of the first and second comparison metrics by comparing the first and second comparison metrics, or a difference between the first and second comparison metrics, to a defined threshold that is set based on one of: a pre-configured value stored in the radio apparatus; or a dynamically configured value that is set according to control signaling received by the radio apparatus.

Additionally, in at least one embodiment, the cell synchronization aspect and possibly known relative time shifts for the cells are taken into account when deciding the first and the second sets of REs (e.g. PRS and non-PRS REs).

With the above examples in mind, then, the present invention in one or more embodiments comprises a method in a UE to blindly detect the absence or presence of RSs by making a comparison that is based on signal samples corresponding to RS resource elements ($RE_{RS}$) and signal samples corresponding to non-RS resource elements ($RE_{NON-RS}$). The non-RS resource elements may be unused resource elements ($RE_{UNUSED}$). Here, an "unused" resource element means that the resource element is not used for the RS transmissions in question.

In an example where the RS in question is a PRS, the notation may be adjusted as follows: $RE_{PRS}$ may be used to indicate REs that are used for PRS transmission (subject to muting), and $RE_{NON-PRS}$ may be used to indicate REs that are not used for PRS transmission (irrespective of muting and at least not within a given cell or cells and/or within given time-frequency resources of interest). In at least one such embodiment, samples corresponding to the two sets of resource elements ($RE_{PRS}$ and $RE_{NON-PRS}$) within the overall or composite OFDM signal are independently correlated with a known PRS pattern and a function of the two correlation outputs is compared to a threshold, denoted as $\Psi_1$.

The threshold $\Psi_1$ is a "relative" threshold in the sense that it is used to compare the difference between the correlation results obtained using the PRS REs versus the results obtained using the non-PRS REs. In this regard, the contemplated threshold comparison offers a number of substantial advantages over a conventional approach wherein an absolute reference value is used for comparison. By taking the difference between correlation results obtained for $RE_{PRS}$ and for $RE_{NON-PRS}$, the present invention "controls" for noise, interference, changing received signal strengths, and a potential host of other variables. (It should be understood that $RE_{PRS}$ and $RE_{NON-PRS}$ designations represent a particular example involving PRS. Thus, unless otherwise noted, the PRS-related examples will be understood as being applicable to other types of reference signals, e.g., with the use of $RE_{RS}$ and $RE_{NON-RS}$.)

With this approach, if the difference between the two correlations is above the defined threshold, then the PRSs are assumed to be present (for a given cell at a given transmission time); otherwise, they are assumed to be absent (i.e. muted). As a special case the threshold can be set to zero dB, and it should be noted that these correlations can be done in the time or frequency domain.

In another embodiment, signals in $RE_{PRS}$ and in $RE_{UNUSED}$ are independently correlated with the known PRS pattern and a function of the two correlation outputs is compared to a relative threshold ($\Psi_2$). If the difference between the two correlations is above the threshold, then PRSs are assumed to be present; otherwise, they are assumed to be muted.

In yet another embodiment, the difference in the average power in $RE_{PRS}$ and in unused REs ($RE_{UNUSED}$) is compared to a relative threshold ($\Psi_3$). If the difference is above the threshold then PRSs are assumed to be present; otherwise, they are assumed to be muted. As a special case, any of the above thresholds can be set to zero dB, and the correlations can be done in the time or frequency domain.

Further, a generic "function" (F) representing the comparisons contemplated in the above embodiments can be expressed, for example, by $$F=f(\Gamma_1,\Gamma_2)=\max(\Gamma_1)-\max(\Gamma_2).$$

where the two strongest peaks, one for each correlator output, are compared and where: $\Gamma_1$ is the filtered or non-filtered correlator output performed on the (target) set $RE_{PRS}$—as an example, $\Gamma_1$ is expressed in the decibel scale above but other scales are not precluded; and $\Gamma_2$ is the filtered or non-filtered correlator output performed on another (reference) set, e.g. $RE_{NON-PRS}$. Again, a dB scale may be used, but other scales are not precluded.

In another similar embodiment, the F-function is the difference between some approximations (e.g., average or the center of gravity or another statistical measure). The approximation is applied as one per correlator output and can be any of the following: an approximation around the main peak; an approximation around some other peak selected according to some criteria/algorithm (e.g., a first sufficiently strong peak such that certain conditions hold); or an approximation on any segment of correlator output, selected according to certain criteria or an algorithm.

Of course, the above generic function F can be further generalized as a function of more than two filtered or non-filtered correlator outputs where each correlator output in ($\Gamma_1$, $\Gamma_2$, ..., $\Gamma_N$) has at least one associated parameter $a_i$ as shown below $$F=f(\Gamma_1,\Gamma_2,\ldots,\Gamma_N,a_1,a_2,\ldots,a_N)$$

and where each $a_i$ in the above expression can be, for example, a weighting factor accounting for one or more of the: measurement quality, the time aspect, different reference sampling patterns, difference in processing gain, network layer (e.g. macro or pico). The weighting factor ($a_i$) can have any positive value. As a special case, the weighting factor $a_i$ can be 0 or 1.

Further, the correlator outputs ($\Gamma_1$, $\Gamma_2$, ..., $\Gamma_N$) can be expressed on any scale, such as linear scale or logarithmic scale or on any suitable scale. Additionally, as a special case the above function F can also be expressed as follows:

$$F=f(a_1\cdot\Gamma_1,a_2\cdot\Gamma_2,\ldots,a_N\cdot\Gamma_N).$$

Additionally, in yet another embodiment, UEs are informed by a network about the sets $RE_{NON-PRS}$ and/or $RE_{UNUSED}$ to use for determining whether the PRSs in a given cell at a given transmission time are or are not muted. As an example, the UEs are provided with certain pattern information. Alternatively, the UE is able to deduce such information from other signaling, e.g. a cell ID can indicate which REs are used for PRS based on the predefined PRS pattern (see TS 36.211).

Still further, in another embodiment, the UE autonomously decides the sampling patterns for the sets $RE_{NON-PRS}$ and/or $RE_{UNUSED}$ based on, for example, an interference or situational analysis. As an example, subframes where the interference and noise are more like colored noise are preferably not considered for the sampling of reference signals.

In yet another embodiment, the sets $RE_{NON-PRS}$ or $RE_{UNUSED}$ comprise the set of REs corresponding to a shifted version of the PRS pattern either in frequency or in time, or according to some other pattern with the same processing gain.

Further, in another embodiment, reference signal sampling at the UE is performed in a different subframe or subframes but on the same REs as $RE_{PRS}$ in the target subframes. The reference and the target subframes may or may not be sequential with respect to each other.

In one example, the UE is connected to a serving cell 16 and has been requested by the network 18 (e.g., an E-SMLC or any other positioning server or node) to perform OTDOA measurements over one or more neighbor cells 16. The UE needs to first detect the PRS, which may be muted in one or more sub-frames in a positioning occasion in a particular cell 16. To detect whether muting is active for that cell 16, for the sub-frames of interest, the UE correlates the received signals on the $RE_{PRS}$ with a pre-defined PRS pattern. The output of the correlation is, for example, on the log scale and denoted as $\Gamma_{PRS}$.

The UE further correlates a set of $RE_{NON-PRS}$ with the reference signal pattern, and the output of that correlation may be denoted as $\Gamma_{NON-PRS}$. Then, the UE calculates a function of $\Gamma_{PRS}$ with $\Gamma_{NON-PRS}$, e.g., a difference function or other operation, and compares the results to a "relative" threshold $\Psi_1$. (As noted, the threshold is relative in the sense that it is used to evaluate the difference between the results obtained using $RE_{NON-PRS}$ and the results obtained using $RE_{PRS}$.) The comparison may be carried out on the logarithm scale, and the receiver determines that the PRS sub-frame is muted if the difference (in the logarithm scale) is below the relative threshold ($\Psi_1$); otherwise the receiver determines that the PRS sub-frame is not muted.

Note that in one or more embodiments contemplated herein, the reference signal transmitted by a given transmitter for a given time period (or given set of time-frequency resources) spans or is otherwise conveyed on a number of OFDM resource elements. It may be that the transmitter applies muting to each such resource element—i.e., the entire reference signal is muted. Alternatively, muting is applied to only a portion of the reference signal within any given reference signal transmission occasion. In such cases, determining whether the reference signal is or is not muted can be understood as, in at least one embodiment, determining whether muting is or in not applied to given portions of the reference signal. In that regard, the receiver may make reference signal measurements within a given reference signal transmission occasion, for those portions of the reference signal that are determined by the receiver not to be muted, and may forego such measurements for those portions that are determined by the receiver to be muted.

Also, as noted earlier, the relative threshold $\Psi_1$ can be set to 0 dB, and the comparative function can be the difference on the log scale between the correlation outputs obtained for $RE_{PRS}$ and $RE_{NON-PRS}$. As noted, the relative threshold can be a pre-defined value, UE implementation specific or signaled to the UE by the network node, e.g., by an E-SMLC or other positioning node, an eNB, a radio network controller, etc.

The above comparative expressions stem from advantageous recognition herein that when PRS is not muted, the correlation output between the $RE_{PRS}$ and the known PRS pattern will be high, e.g., a large value (or maximum normalized=1 in linear scale). On the other hand, when the PRS is not transmitted (muted) the correlation between the $RE_{PRS}$ and the PRS pattern will be a smaller value. Similarly the output of the correlation in REs containing non-PRS signals (e.g. CRS, PSS, SSS, PDCCH, PHICH, PCFIC etc) will be a smaller value. As noted, the $RE_{NON-PRS}$ used for the comparative correlation may be unused REs ($RE_{UNUSED}$).

The UE can therefore use the above scheme for blind detection of the PRS muting in a cell. However, even in case of explicit signaling containing the PRS muting information (e.g. positioning occasion/sub-frames which may be muted), the UE may still use the above method for the detection of PRS and/or PRS muting. One advantage of performing the blind detection of PRS muting, even in a case where muting status is signaled is that the UE may incorrectly receive the status information and blind detection therefore provides a mechanism for determining muting status with increased reliability.

In one such embodiment, when defining the set of unused REs one can utilize the fact that an MBSFN subframe can be configured as a positioning subframe, i.e., when MBSFN subframes are configured as positioning subframes the UE knows, for example, that the CRS symbols are not used for transmissions and there is no PDSCH transmitted in the data part (i.e. resource elements used for the MBSFN data) of the subframe. Similarly, a positioning subframe is in general configured as a low-interference subframe, i.e. no data is scheduled although (unlike with MBSFN) CRS is in general transmitted in all CRS symbols in a unicast subframe (i.e. which is not a MBSFN sub-frame).

Also, as detailed, the UE can autonomously detect muting based on determining the first and second detection metrics according to received signal power. As a particular example, the UE measures the power of the $RE_{PRS}$ of the received OFDM signal, where the measured power can be expressed on a log scale as $\beta_{PRS}$. The UE further measures the power of the $RE_{UNUSED}$ of the received OFDM signal, expressed as $\beta_{UNUSED}$. The UE compares these measured powers to a relative threshold ($\Psi_3$), according to some function. For example, the UE may compare the absolute value of the difference to the threshold and determine whether the reference signal is or is not muted in a given sub-frame, based on the comparison. In one embodiment, the condition $|\beta_{PRS}-\beta_{UNUSED}|>\Psi_3$ [dB] is taken by the UE as an indication that the reference signals are not muted. Conversely, the condition $|\beta_{PRS}-\beta_{UNUSED}|\leq\Psi_3$ [dB] is taken as an indication that the reference signals are muted for the sub-frame.

As a special case, the relative threshold ($\Psi_3$) can be set to 0 dB, and the function (e.g., $|\beta_{PRS}-\beta_{UNUSED}|$) can be the weighted difference on the log scale between the measured powers. Further, the power measurements can be expressed in terms of mean power of all or a sub-set of REs in a sub-frame. Alternatively another metric such as X percentile or medium value of the measured power can also be used. Still further, the threshold used for comparison can be a pre-defined value, UE implementation specific or signaled to the UE by the network node e.g. E-SMLC, eNB, positioning node, radio network controller, etc.

However, whether the UE determines it comparison metrics based on power measurements, as above, or uses a different technique, such as the earlier-described correlation-based comparison metrics, the present invention offers a number of advantages. As a non-limiting example of those advantages, the present invention provides a method that enables the improved detection of PRS muting and thus provides for more accurate OTDOA measurements, such as reference signal time difference (RSTD), which in turn improves the positioning accuracy.

As one of its particular advantages, the use of relative comparisons cancels the impact of colored interference and noise and thus improves muting detection. This improved reference signal muting detection enables a UE, for example, to set appropriate detection thresholds for the detection of muting at the neighbor cells. Further, UE power consumption is reduced due to improved detection probability, which ensures that the UE does not have to excessively detect cells (especially the weak cells). Additionally, UE processing is reduced because the UE can detect the reference signal muting in fewer attempts due to the improved detection mechanisms proposed herein.

Still further, the comparative approach taught herein particularly provides gains for the reliable detection of reference signal muting as regards weaker cells and can be applied in principle to any reference signals, not limited to positioning only, on per-symbol basis, per-subframe basis or over multiple sub-frames. This means that the comparative approach described by way of example herein can be used for the detection of the presence or absence (i.e. whether it is transmitted or not) of any known signal (e.g. reference or pilot signal). Furthermore, the method and radio receiver apparatus given by way of example herein can be used in essentially any node, such as a UE or a radio network node, such as a base station or a network controller.

The present invention will be broadly understood as providing a method and apparatus for detecting whether a given signal is or is not being transmitted, based on determining a first comparison metric from first received signal components that are used for transmitting the given signal and determining a second comparison metric from second received signal components that are not used for transmitting the given signal. As an example, the first comparison metric is generated from resource elements of a received OFDM signal that are known or expected to be used for transmitting the signal, unless the signal is being muted, and the second comparison metric is generated from resource elements of a received OFDM signal that are known or expected not to carry the signal (although they may carry other signals or may be "empty"). By comparing these first and second comparison metrics and detecting muting of the signal of interest based on that relative comparison, the present invention effectively cancels or otherwise masks the effects of colored interference and noise from the detection process.

With these aspects in mind, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Finally, although specific terms may be employed herein, they are used in a descriptive sense for purposes of explanation and not for purposes of limitation.

What is claimed is:

1. A method in a radio apparatus of autonomously detecting whether a reference signal within an OFDM signal transmitted by a remote transmitter is muted for a given transmission time, the method comprising:
   receiving the OFDM signal;
   calculating a first comparison metric from signal samples of the OFDM signal corresponding to a first set of resource elements of the OFDM signal;
   calculating a second comparison metric from signal samples of the OFDM signal corresponding to a second set of resource elements of the OFDM signal;
   determining whether the reference signal is muted by the remote transmitter over the given transmission time by comparing the first and second comparison metrics; and
   performing reference signal measurements responsive to determining that the reference signal is not muted, or forgoing reference signal measurements at least for any resource elements of the reference signal that are determined to be muted;
   wherein calculating the first comparison metric comprises determining first correlation results by correlating the OFDM signal as received on the first set of resource elements with a known reference signal pattern;
   wherein calculating the second comparison metric comprises determining second correlation results by correlating the OFDM signal as received on the second set of resource elements with the known reference signal pattern; and
   wherein determining whether the reference signal is muted over the given transmission time further comprises:
     determining a difference between the first and second correlation results;
     comparing that difference to a defined threshold; and
     determining that the reference signal is not muted if the difference exceeds the defined threshold, otherwise determining that the reference signals is muted.

2. The method of claim 1, wherein:
   the first set of resource elements correspond to certain ones among a plurality of subcarriers of the OFDM signal taken at defined symbol times;
   the second set of resource elements correspond to certain other ones among the plurality of subcarriers taken at the same or at other defined symbol times; and
   at least for the given transmission time, the first set of resource elements may or may not carry the reference signal depending upon whether muting is applied and the second resource elements do not carry the reference signal irrespective of whether muting is applied.

3. The method of claim 1, further comprising receiving control signaling at the radio apparatus, the control signaling assisting the radio apparatus in deciding which resource elements to use as said second set of resource elements from among a plurality of resource elements of the OFDM signal.

4. The method of claim 1, further comprising determining which resource elements of the OFDM signal to use as said second set of resource elements based on one of:
   determining a sampling pattern that dictates which resource elements are used as said second set of resource elements based on evaluating interference in the OFDM signal; and
   determining a sampling pattern that dictates which resource elements are used as said second set of resource elements based on shifting a known resource element allocation pattern used for transmitting the reference signals by the remote transmitter of a cell that is currently measured by the radio apparatus.

5. The method of claim 1, wherein:
   the reference signal comprises a positioning reference signal conveyed using the first set of resource elements; and
   muting or puncturing of the reference signal is selectively applied by the remote transmitter for some or all of the resource elements in the first set of resource elements.

6. The method of claim 1, wherein one of the first and second sets of resource elements comprise resource elements corresponding to a pre-defined reference signal pattern associated with the remote transmitter.

7. The method of claim 1, wherein:
   calculating the first comparison metric comprises estimating a first received signal power from the signal samples of the OFDM signal corresponding to the first set of resource elements;
   calculating the second comparison metric comprises estimating a second received signal power from the signal samples of the OFDM signal corresponding to the second set of resource elements; and
   determining whether the reference signal is muted comprises:
     determining a power difference between the first and second received signal powers;
     determining that the reference signal is muted if the power difference is within a defined range; and
     otherwise determining that the reference signal is not muted.

8. The method of claim 7, further comprising selecting the second set of resource elements as resource elements that are unused resource elements at least for the given transmission time.

9. The method of claim 1, further comprising setting a detection threshold used for autonomously detecting whether reference signals transmitted by another remote transmitter are muted, based on the values calculated for the first and second comparison metrics.

10. The method of claim 1, wherein comparing the first and second comparison metrics comprises comparing the first and second comparison metrics, or a difference between the first and second comparison metrics, to a defined threshold that is set based on one of a pre-configured value stored in the radio apparatus or a dynamically configured value set according to control signaling received by the radio apparatus.

11. A radio apparatus configured to autonomously detect whether the reference signal is muted for a given transmission time, the radio apparatus comprising:
   a communication transceiver configured to receive an OFDM signal from a remote transmitter, wherein the OFDM signal includes a reference signal;
   a measurement circuit configured to calculate a first comparison metric from signal samples of the OFDM signal corresponding to a first set of resource elements of the OFDM signal, and to calculate a second comparison metric from signal samples of the OFDM signal corresponding to a second set of resource elements of the OFDM signal; and
   an evaluation circuit configured to determine whether the reference signal is muted for the given transmission time by comparing the first and second comparison metrics; and
   a processing circuit configured to perform reference signal measurements responsive to the evaluation circuit determining that the reference signal is not muted, and to forgo reference signal measurements, at least with respect to any resource elements of the reference signal that are determined to be muted;
   wherein the measurement circuit is further configured to:
      calculate the first comparison metric based on first correlation results determined by correlating the OFDM signal as received on the first set of resource elements with a known reference signal pattern; and
      calculate the second comparison metric based on second correlation results determined by correlating the OFDM signal as received on the second set of resource elements with the known reference signal pattern; and
   wherein the evaluation circuit is further configured to determine whether the reference signal is muted for the given transmission time by:
      determining a difference between the first and second correlation results;
      comparing that difference to a defined threshold; and
      determining that the reference signal is not muted if the difference exceeds the defined threshold, otherwise determining that the reference signal is muted.

12. The radio apparatus of claim 11, wherein
   the first set of resource elements corresponds to certain ones among a plurality of subcarriers of the OFDM signal taken at defined symbol times;
   the second set of resource elements corresponds to certain other ones among the plurality of subcarriers taken at the same or at other defined symbol times; and
   at least for the given transmission time, whether the first resource elements carry the reference signal depending upon whether muting is applied and whether the second resource elements do not carry the reference signal irrespective of whether muting is applied.

13. The radio apparatus of claim 11, wherein the radio apparatus is further configured to receive control signaling that indicates which resource elements of the OFDM signal to use as the second set of resource elements.

14. The radio apparatus of claim 11, wherein the radio apparatus is further configured to determine which resource elements of the OFDM signal to use as said second set of resource elements based on one of:
   a sampling pattern dictating which elements are used as said second set of resource elements and determined based on evaluating interference in the OFDM signal, the sampling pattern; and
   a sampling pattern dictating which elements are used as said second set of resource elements and determined based on shifting a known resource element allocation pattern used for transmitting the reference signals, the sampling pattern.

15. The radio apparatus of claim 11, wherein the reference signal comprising a positioning reference signal conveyed using the first set of resource elements, and wherein muting or puncturing of the reference signal is selectively applied by the remote transmitter for some or all of the resource elements in the first set of resource elements.

16. The radio apparatus of claim 11, wherein one of the first and second sets of resource elements comprise resource elements corresponding to a predefined reference signal pattern associated with the remote transmitter.

17. The radio apparatus of claim 11:
   wherein the measurement circuit is further configured to:
      calculate the first comparison metric by estimating a first received signal power from the signal samples of the OFDM signal corresponding to the first set of resource elements of the OFDM signal; and
      calculate the second comparison metric by estimating a second received signal power from the signal samples of the OFDM signal corresponding to the second set of resource elements of the OFDM signal; and
   wherein the evaluation circuit is configured to determine whether the reference signal is muted for the given transmission time by:
      determining a power difference between the first and second received signal powers;
      determining that the reference signal is muted if the power difference is within a defined range; and
      otherwise determining that the reference signal is not muted.

18. The radio apparatus of claim 17, wherein the radio apparatus is further configured to select the second set of resource elements as resource elements that are unused resource elements, at least for the given transmission time.

19. The radio apparatus of claim 11, wherein the radio apparatus is further configured to set a detection threshold used for autonomously detecting whether reference signals transmitted by another remote transmitter are muted based on the values calculated for the first and second comparison metrics.

20. The radio apparatus of claim 11, wherein evaluation circuit is configured to compare the first and second comparison metrics by comparing the first and second comparison metrics, or a difference between the first and second comparison metrics, to a defined threshold set based on one of a pre-configured value stored in the radio apparatus and a dynamically configured value set according to control signaling received by the radio apparatus.

* * * * *